United States Patent
Yoshitomi et al.

(10) Patent No.: US 8,623,570 B2
(45) Date of Patent: Jan. 7, 2014

(54) FUEL CELL STACK

(75) Inventors: Ryoichi Yoshitomi, Utsunomiya (JP); Ken Takahashi, Shimotsuga-gun (JP); Masaharu Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 806 days.

(21) Appl. No.: 12/634,255

(22) Filed: Dec. 9, 2009

(65) Prior Publication Data
US 2010/0143766 A1 Jun. 10, 2010

(30) Foreign Application Priority Data
Dec. 9, 2008 (JP) .................................. 2008-313368

(51) Int. Cl.
*H01M 2/02* (2006.01)
(52) U.S. Cl.
USPC ............................ 429/508; 429/507; 429/452
(58) Field of Classification Search
USPC ....................................................... 180/68.5
See application file for complete search history.

(56) References Cited

U.S. PATENT DOCUMENTS

2006/0061080 A1* 3/2006 Luttinen et al. ............... 280/784
2008/0268319 A1* 10/2008 Sakano et al. ................. 429/34

FOREIGN PATENT DOCUMENTS

| JP | 8-171926 | 7/1996 | |
|----|----------|--------|---|
| JP | 8-233442 | 9/1996 | |
| JP | 2005-116227 | 4/2005 | |
| JP | 2006-108009 A * | 4/2006 | ............ H01M 8/24 |
| JP | 2007-112356 | 5/2007 | |
| JP | 2008-2105 | 1/2008 | |
| JP | 2008-27761 | 2/2008 | |

OTHER PUBLICATIONS

Machine translation of JP 2006-108009.*
Japanese Office Action for Application No. 2008-313368, dated May 24, 2011.

* cited by examiner

*Primary Examiner* — Maria J Laios
(74) *Attorney, Agent, or Firm* — Nelson Mullins Riley & Scarborough LLP; Anthony A. Laurentano

(57) ABSTRACT

A fuel cell stack includes a casing containing a plurality of fuel cell units. A ridge is formed integrally at the center in the width direction of a side panel of the casing. The ridge contacts a load receiver to support the load of the fuel cell units. A plurality of separate reinforcement plates bridging a recess of the back surface of the ridge are provided on the side panel. The reinforcement plates are fixed to the side panel at welding points by spot welding.

7 Claims, 17 Drawing Sheets

FUEL CELL STACK

CROSS-REFERENCE TO RELATED APPLICATION

This application is based upon and claims the benefit of priority from Patent Application No. 2008-313368 filed on Dec. 9, 2008, in the Japan Patent Office, of which the contents are incorporated herein by reference.

BACKGROUND OF THE INVENTION

1. Field of the Invention

The present invention relates to a fuel cell stack comprising a stack body formed by stacking a plurality of unit cells in a horizontal direction, and a casing containing the stack body. Each of the unit cells is formed by sandwiching an electrolyte electrode assembly between separators. The electrolyte electrode assembly includes a pair of electrodes and an electrolyte interposed between the electrodes.

2. Description of the Related Art

For example, a solid polymer electrolyte fuel cell employs an electrolyte membrane (electrolyte). The electrolyte membrane is a polymer ion exchange membrane. The electrolyte membrane is interposed between an anode and a cathode to form a membrane electrode assembly (MEA). The membrane electrode assembly and separators sandwiching the membrane electrode assembly make up a unit cell for generating electricity. In use, typically, a predetermined number (e.g., several tens to hundreds) of unit cells are stacked together to form a fuel cell stack for achieving the desired level of power generation output.

The fuel cell stack has the stack body formed by stacking a predetermined number of unit cells and a box-shaped casing containing the stack body. In order to suppress the increase in the weight and dimensions of the entire fuel cell stack, in most cases, the casing is made of thin metal plates. Under the circumstances, the stack body formed by stacking a large number of unit cells is considerably heavy. Therefore, since an excessively large load of the stack body is applied to the bottom of the casing, the bottom of the casing may be deformed undesirably.

In this regard, as shown in FIG. 17, a fuel cell disclosed in Japanese Laid-Open Patent Publication No. 08-171926 includes a lower case 1, and the lower case 1 is made up of a bottom part 2 and side parts 3. The bottom part 2 has an upwardly protruding curved portion 4, and curved portions 5 adjacent to the respective side parts 3.

Further, a downwardly protruding curved portion 6 is formed at the bottom part 2. The curved portions 4, 5 are used for positioning components stacked into a stack body (not shown). Moreover, the curved portions 4, 5, 6 achieve improvement in the rigidity of the lower case 1.

In the conventional technique, in particular, when the heavy stack body is disposed in the lower case 1, a considerably large load is applied to the bottom part 2. In particular, an excessively large load tends to be applied to the curved portion 4. Therefore, the bottom part 2 tends to be deformed easily in a direction to open the curved portion 4 (toward the side plates 3).

SUMMARY OF THE INVENTION

The present invention has been made to solve the problem of this type, and an object of the present invention is to provide a fuel cell stack which makes it possible to achieve reduction in the thickness and the weight of a casing, and reliably support the load of a stack body to suitably prevent deformation.

The present invention relates to a fuel cell stack comprising a stack body formed by stacking a plurality of unit cells in a horizontal direction, and a casing containing the stack body. Each of the unit cells is formed by sandwiching an electrolyte electrode assembly between separators. The electrolyte electrode assembly includes a pair of electrodes and an electrolyte interposed between the electrodes.

The casing has a bottom plate member including a ridge for receiving a load of the stack body, and a separate reinforcement member bridging a recess of the back surface of the ridge is provided on the bottom plate member.

In the present invention, the load of the stack body is supported by a relatively low ridge provided integrally with the bottom plate member of the casing. By the reinforcement member bridging the recess, which corresponds to the back surface of the ridge, deformation in a direction to open the ridge is prevented. In the structure, reduction in the thickness and the cost of the casing itself is achieved. Further, it becomes possible to improve the rigidity in cross section, the flexural elasticity, and the shearing reaction force, and thus, obtain the lightweight casing having high rigidity. Further, the height of the ridge is reduced effectively, and the overall height of the casing is reduced as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
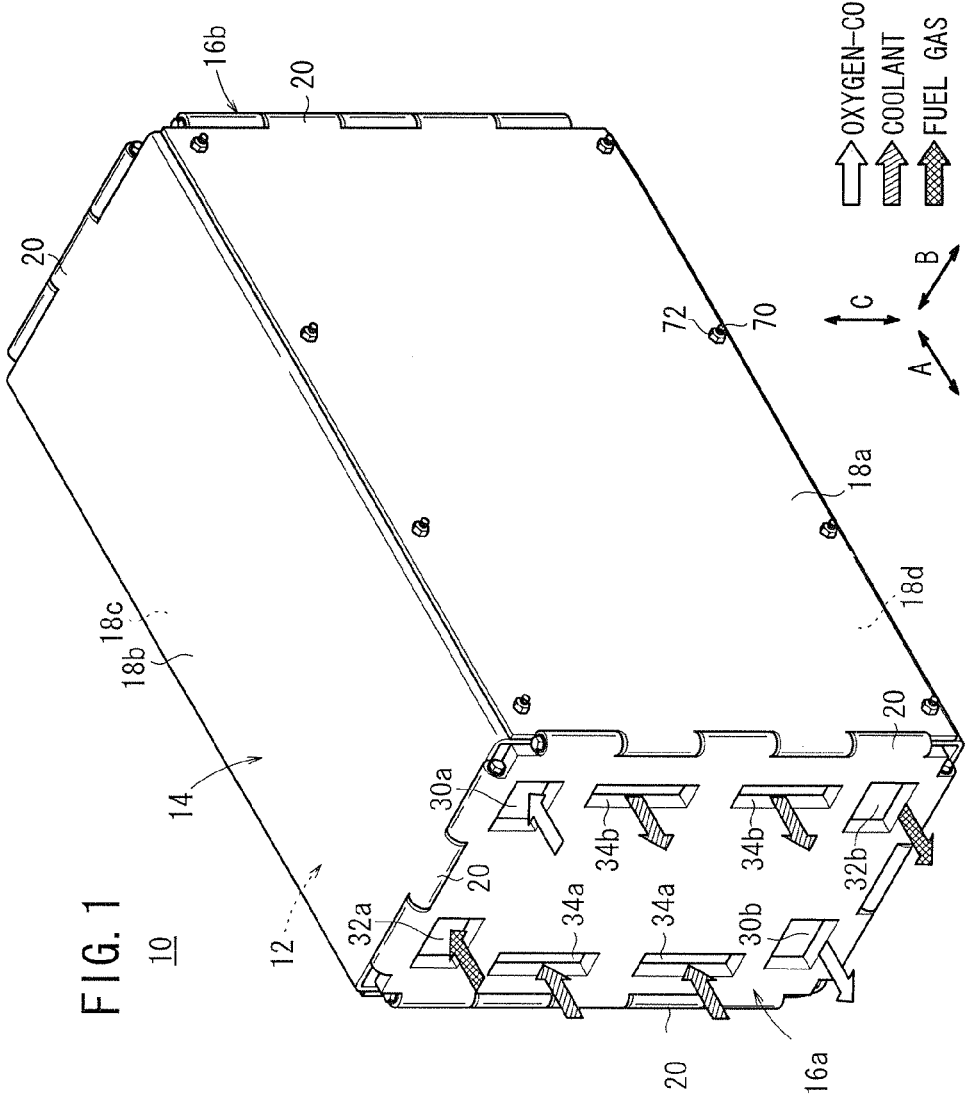
FIG. 1 is a perspective view schematically showing a fuel cell stack according to a first embodiment of the present invention.

FIG. 1 shows a fuel cell stack 10 according to a first embodiment of the present invention. For example, the fuel cell stack 10 is mounted in a vehicle. The fuel cell stack 10 includes a plurality of fuel cell units (unit cells) 12 stacked together in a direction indicated by an arrow A and a box-shaped casing 14 containing the fuel cell units 12. The casing 14 includes end plates 16a, 16b provided at opposite ends of the fuel cell units 12 in the stacking direction, four side panels 18a to 18d provided on sides of the fuel cell units 12, and hinge mechanisms 20 for coupling the end plates 16a, 16b and the side panels 18a to 18d together. The side panels 18a to 18d are made of stainless steel (e.g., SUS 304) or other metal material, or carbon material.

Figure 2:
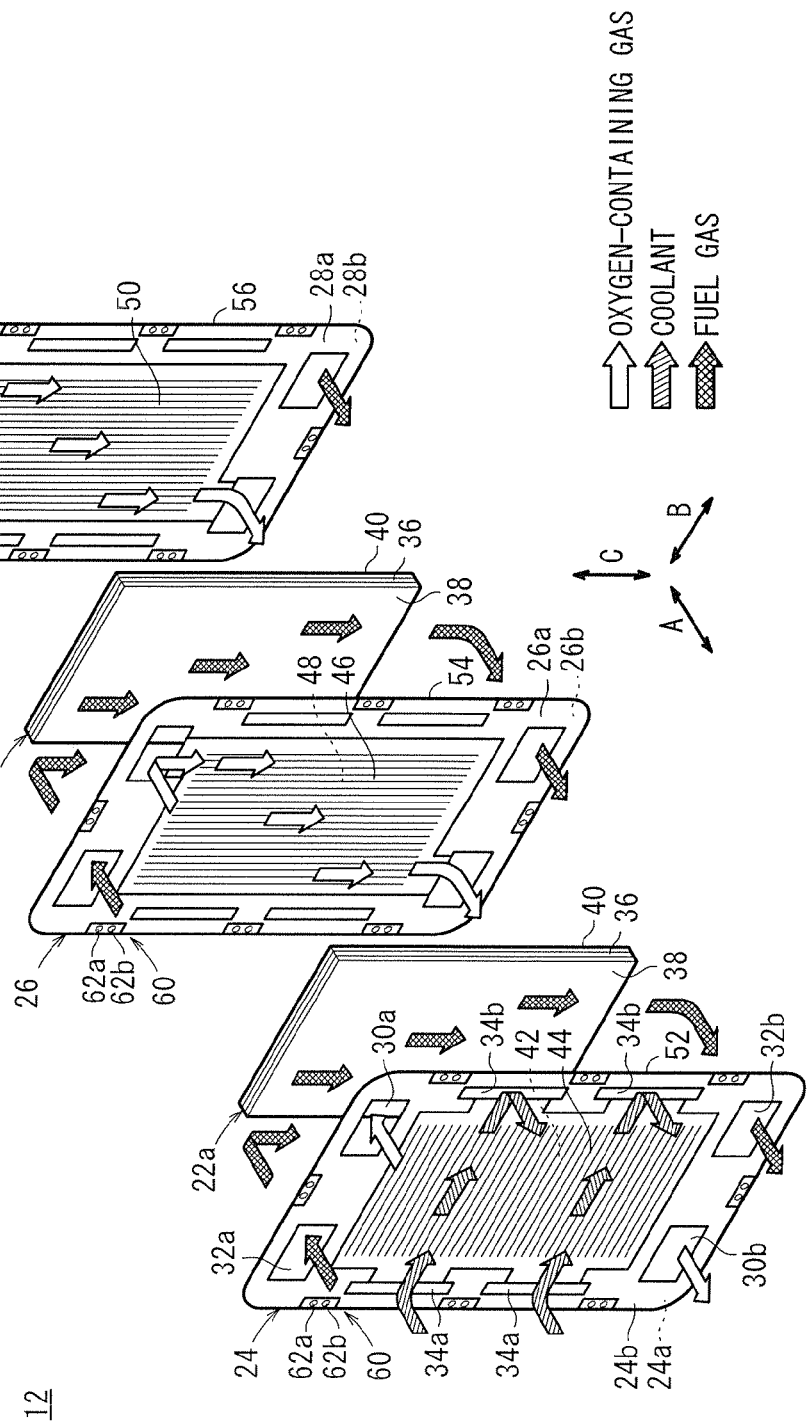
FIG. 2 is an exploded perspective view of a fuel cell unit of the fuel cell stack.

As shown in FIG. 2, the fuel cell unit 12 includes a first membrane (electrolyte) electrode assembly (MEA) 22a, a second membrane electrode assembly (MEA) 22b, a first separator 24, a second separator 26, and a third separator 28. The first membrane electrode assembly 22a is sandwiched between the first separator 24 and the second separator 26, and the second membrane electrode assembly 22b is sandwiched between the second separator 26 and the third separator 28.

In the illustrated embodiment, the first to third separators 24, 26, 28 are metal separators. Alternatively, carbon separators may be adopted.

At one end (upper end) of the fuel cell unit 12 in a longitudinal direction indicated by an arrow C in FIG. 2, an oxygen-containing gas supply passage 30a for supplying an oxygen-containing gas and a fuel gas supply passage 32a for supplying a fuel gas such as a hydrogen-containing gas are provided. The oxygen-containing gas supply passage 30a and the fuel gas supply passage 32a extend through the fuel cell unit 12 in the direction indicated by the arrow A.

At the other end (lower end) of the fuel cell unit 12 in the longitudinal direction, a fuel gas discharge passage 32b for discharging the fuel gas and an oxygen-containing gas discharge passage 30b for discharging the oxygen-containing gas are provided. The fuel gas discharge passage 32b and the oxygen-containing gas discharge passage 30b extend through the fuel cell unit 12 in the direction indicated by the arrow A.

At one end of the fuel cell unit 12 in a lateral direction indicated by an arrow B, two coolant supply passages 34a for supplying a coolant are provided, and at the other end of the fuel cell unit 12 in the lateral direction, two coolant discharge passages 34b for discharging the coolant are provided.

For example, each of the first membrane electrode assembly 22a and the second membrane electrode assembly 22b includes an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example.

Each of the anode 38 and the cathode 40 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

The first separator 24 has a first fuel gas flow field 42 on a surface 24a facing the first membrane electrode assembly 22a. The first fuel gas flow field 42 connects the fuel gas supply passage 32a and the fuel gas discharge passage 32b. For example, the first fuel gas flow field 42 includes a plurality of grooves extending in the direction indicated by the arrow C. A coolant flow field 44, which connects the coolant supply passages 34a and the coolant discharge passages 34b, is formed on a surface 24b of the first separator 24. The coolant flow field 44 includes a plurality of grooves extending in the direction indicated by the arrow B.

The second separator 26 has a first oxygen-containing gas flow field 46 on a surface 26a facing the first membrane electrode assembly 22a. The first oxygen-containing gas flow field 46 is connected to the oxygen-containing gas supply passage 30a and the oxygen-containing gas discharge passage 30b. For example, the first oxygen-containing gas flow field 46 includes a plurality of grooves extending in the direction indicated by the arrow C. The second separator 26 has a second fuel gas flow field 48 on a surface 26b facing the second membrane electrode assembly 22b. The second fuel gas flow field 48 is connected to the fuel gas supply passage 32a and the fuel gas discharge passage 32b.

The third separator 28 has a second oxygen-containing gas flow field 50 on a surface 28a facing the second membrane electrode assembly 22b. The second oxygen-containing gas flow field 50 is connected to the oxygen-containing gas supply passage 30a and the oxygen-containing gas discharge passage 30b. A surface 28b of the third separator 28 and the surface 24b of the first separator 24 are overlapped with each other to form the coolant flow field 44.

A first seal member 52 is formed integrally on surfaces 24a, 24b of the first separator 24 around the outer circumferential end of the first separator 24. A second seal member 54 is formed integrally on surfaces 26a, 26b of the second separator 26 around the outer circumferential end of the second separator 26. Further, a third seal member 56 is formed integrally on surfaces 28a, 28b of the third separator 28 around the outer circumferential end of the third separator 28.

A plurality of resin load receivers 60 are provided integrally with the outer circumferential end of the first separator 24. Specifically, one load receiver 60 is provided in each of an upper central position and a lower central position of the first separator 24. Further, three load receivers 60 are provided on the left side of the first separator 24, and three load receivers 60 are provided on the right side of the first separator 24. A pair of holes 62a, 62b are provided in parallel in each of the load receivers 60.

Likewise, a plurality of resin load receivers 60 are provided integrally with the outer circumferential ends of the second separator 26 and the third separator 28. The first separator 24, the second separator 26, and the third separator 28 are fixed together by insulating resin clips (not shown) inserted into the respective holes 62a (or 62b).

In the first embodiment, the fuel cell unit 12 is used as a unit cell. However, the present invention is not limited in this respect. For example, a unit cell formed by sandwiching a MEA between two separators may be adopted. Also in the other embodiments described later, the unit cell is not limited to use the fuel cell unit 12.

Figure 3:
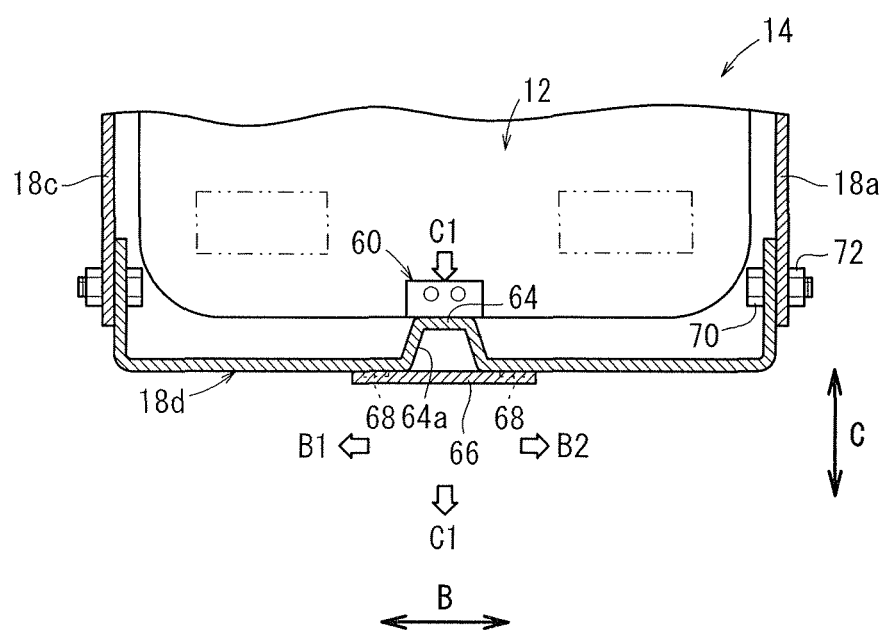
FIG. 3 is a cross sectional view of a lower part of a casing of the fuel cell stack.
Figure 4:
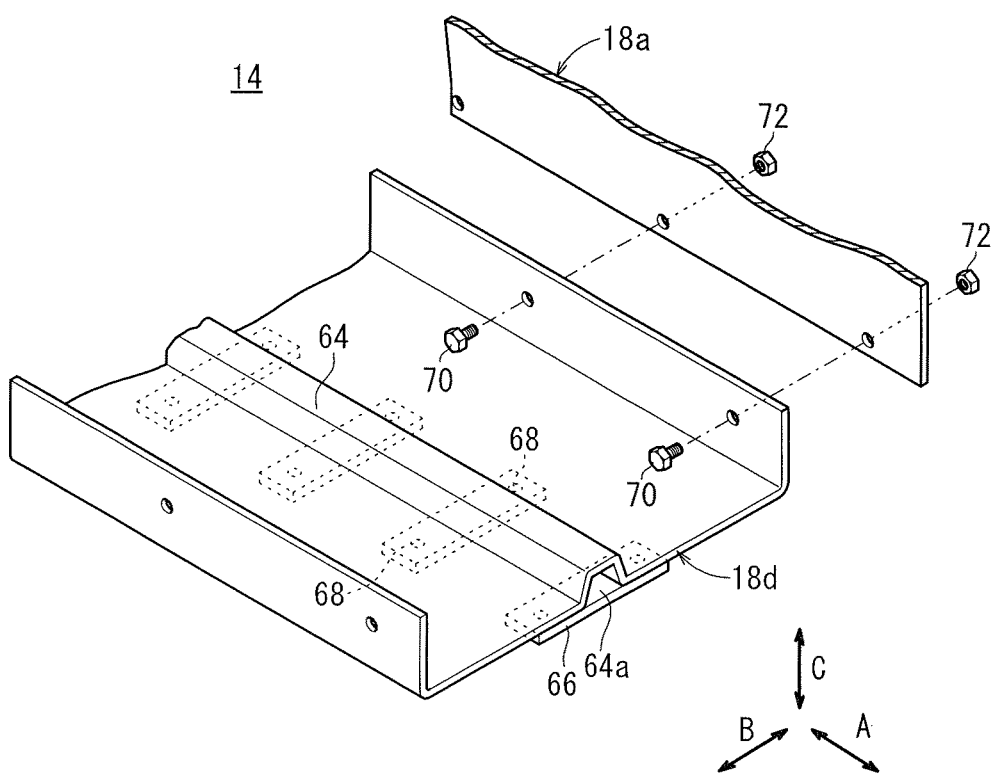
FIG. 4 is an exploded perspective view of the lower part of the casing.

As shown in FIGS. 3 and 4, a ridge 64 is formed integrally, at the center of the side panel (bottom plate member) 18d of the casing 14 in a width direction indicated by an arrow B. The ridge 64 abuts against the load receivers 60 and receives the loads of the fuel cell units 12. The ridge 64 extends in a longitudinal direction of the side panel 18*d* indicated by an arrow A (stacking direction of the fuel cell unit 12). The side panel 18*d* has a plurality of separate reinforcement plates (reinforcement members) 66 bridging a recess 64*a*, which forms the back surface of the ridge 64. The ridge 64 may be divided into a plurality of portions.

Figure 5:
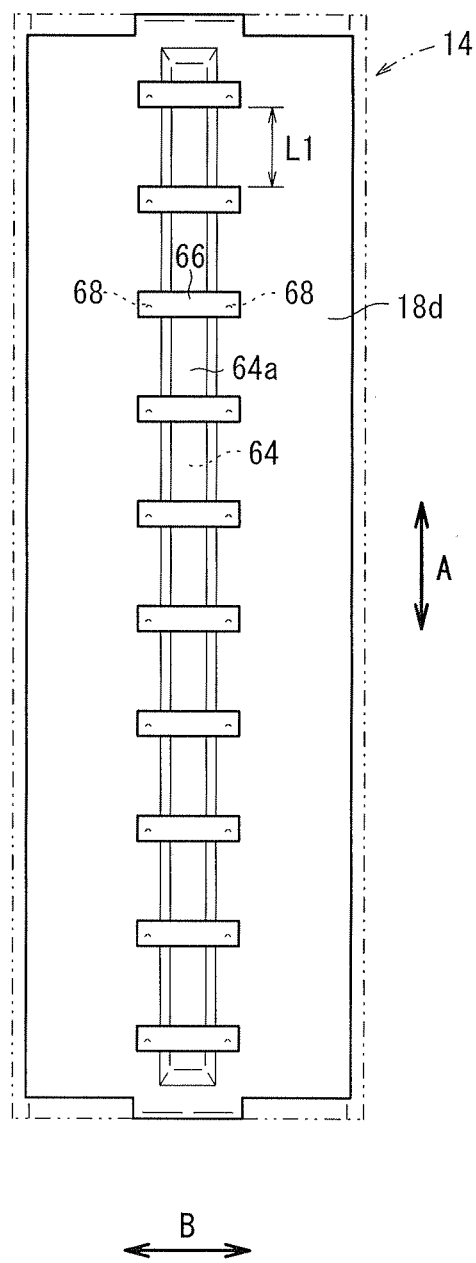
FIG. 5 is a bottom view of the fuel cell stack.

As shown in FIGS. 4 and 5, the reinforcement plate 66 bridging the recess 64*a* has a flat shape, and is provided on the outer surface of the side panel 18*d*. Both ends of the reinforcement plate 66 are fixed to welding points 68 of the side panel 18*d* by spot welding. As shown in FIG. 5, the reinforcement plates 66 are fixed to the side panel 18*d* at intervals of L1 in the direction indicated by the arrow A. It should be noted that the reinforcement plates 66 may be fixed to the side panel 18*d* by other fixing methods such as crimping or brazing, or using rivets or screws.

The coupling portions of the side panels 18*a* to 18*d* are fixed together by bolt members 70 and nuts 72. Tip ends of the bolt members 70 are screwed into the nuts 72 (see FIGS. 3 and 4).

Operation of the fuel cell stack 10 will be described below.

Firstly, as shown in FIG. 1, in the fuel cell stack 10, an oxygen-containing gas (air) is supplied to the oxygen-containing gas supply passage 30*a*, and a fuel gas such as a hydrogen-containing gas is supplied to the fuel gas supply passage 32*a*. Further, pure water, ethylene glycol, oil or the like is supplied to the two coolant supply passages 34*a*.

As shown in FIG. 2, the oxygen-containing gas is supplied to the oxygen-containing gas supply passage 30*a* of the fuel cell unit 12 in the direction indicated by the arrow A, and flows into the first oxygen-containing gas flow field 46 of the second separator 26 and the second oxygen-containing gas flow field 50 of the third separator 28. The oxygen-containing gas supplied into the first oxygen-containing gas flow field 46 flows along the cathode 40 of the first membrane electrode assembly 22*a*, and the oxygen-containing gas supplied into the second oxygen-containing gas flow field 50 flows along the cathode 40 of the second membrane electrode assembly 22*b*.

The fuel gas is supplied through the fuel gas supply passage 32*a* into the first fuel gas flow field 42 of the first separator 24 and the second fuel gas flow field 48 of the second separator 26. Thus, the fuel gas flows along the anodes 38 of the first membrane electrode assembly 22*a* and the second membrane electrode assembly 22*b*.

Thus, in each of the first membrane electrode assemblies 22*a* and the second membrane electrode assemblies 22*b*, the oxygen-containing gas supplied to the cathode 40, and the fuel gas supplied to the anode 38 are consumed in the electrochemical reactions at catalyst layers (not shown) of the cathode 40 and the anode 38 for generating electricity.

Then, the oxygen-containing gas after partially consumed at each cathode 40 flows into the oxygen-containing gas discharge passage 30*b*, and is discharged from the fuel cell stack 10. Likewise, the fuel gas after partially consumed at each anode 38 flows into the fuel gas discharge passage 32*b*, and is discharged from the fuel cell stack 10.

Further, the coolant flows from the coolant supply passages 34*a* to the coolant flow field 44 between the fuel cell units 12, and flows in the direction indicated by the arrow B. After the coolant is used for skip cooling of the first membrane electrode assembly 22*a* and the second membrane electrode assembly 22*b*, the coolant flows through the coolant discharge passages 34*b*, and is discharged from the fuel cell stack 10.

In the fuel cell stack 10, a plurality of the fuel cell units 12 are disposed in the casing 14. The load of the fuel cell units 12 is applied to the single ridge 64 formed integrally with the side panel 18*d*. Therefore, as show in FIG. 3, the downward deflection force in a direction indicated by the arrow C1 is applied to the ridge 64. Therefore, the ridge 64 tends to be deformed in a direction to open the recess 64*a* (in the directions indicated by arrows B1 and B2).

In this regard, in the first embodiment, the side panel 18*d* has the separate reinforcement plates 66 bridging the recess 64*a*, which is the back surface of the ridge 64. Therefore, in the side panel 18*d*, deformation in the directions indicated by the arrow B1 and B2 due to the deflection force applied in the direction indicated by the arrow C1 is prevented reliably.

Figure 6:
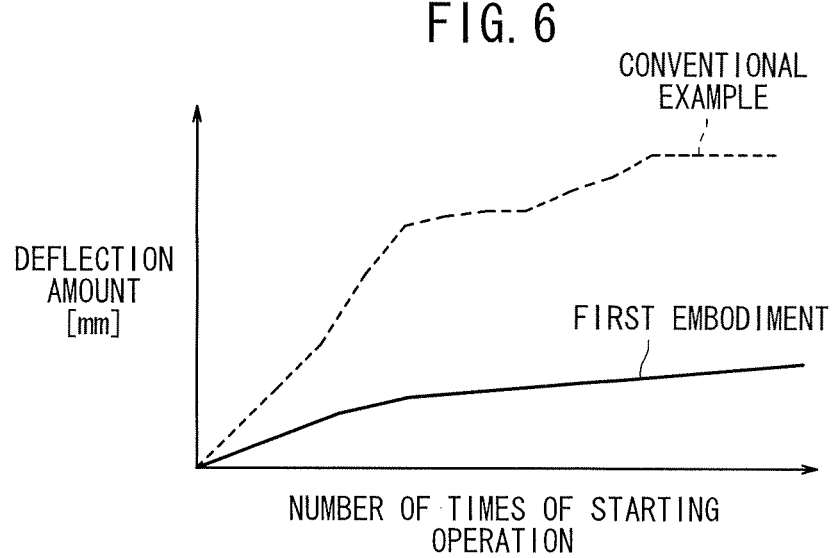
FIG. 6 is a graph showing the relationship between the number of times of starting operation and the deflection amount in a stacking direction in a conventional example and a first embodiment.

Specifically, in each of a conventional example where no reinforcement plates 66 are provided and the first embodiment, an experiment was conducted for detecting the relationship between the number of times of starting operation and the deflection amount in the stacking direction. The results are shown in FIG. 6. As can be seen from FIG. 6, in the conventional example, every time operation of the fuel cell is started particularly at low temperature, the deflection load is increased and the deflection amount is increased.

In the first embodiment, reduction in the thickness and the cost of the casing 14 itself is achieved. Further, it becomes possible to improve the rigidity in cross section, the flexural rigidity, and the shearing reaction force, and thus, obtain the lightweight casing 14 having high rigidity.

Further, the height of the ridge 64 is reduced effectively, and the overall height of the casing 14 is reduced as much as possible.

Figure 7:
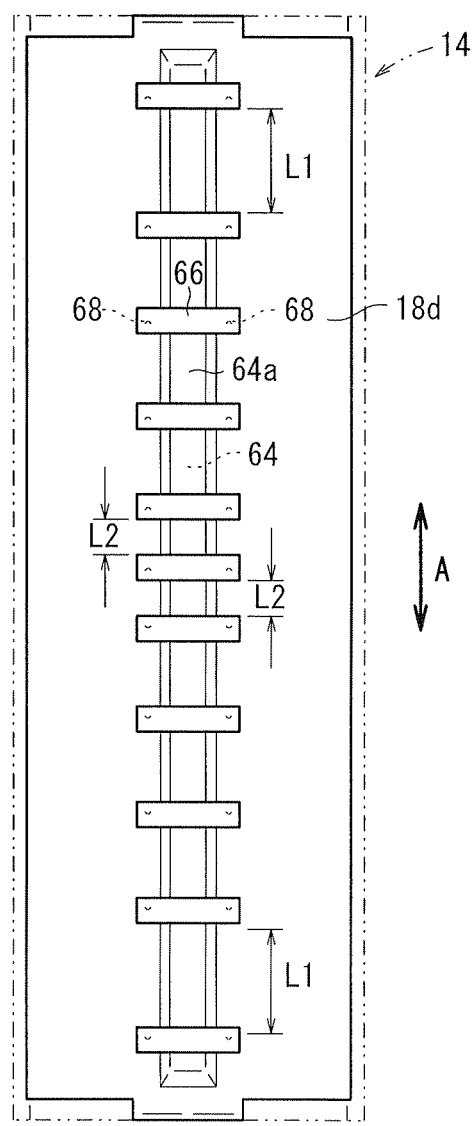
FIG. 7 is a bottom view of a fuel cell stack according to a second embodiment of the present invention.

FIG. 7 is a bottom view of a fuel cell stack 80 according to a second embodiment of the present invention. The constituent elements that are identical to those of the fuel cell stack 10 according to the first embodiment are labeled with the same reference numerals, and description thereof will be omitted. In third and other embodiments described later, the constituent elements that are identical to those of the fuel cell stack 10 according to the first embodiment are labeled with the same reference numerals and description thereof will be omitted.

A plurality of reinforcement plates 66 bridging the recess 64*a* are fixed individually to the side panel 18*d* of the fuel cell stack 80. The interval between the reinforcement plates 66 at both ends of the side panel 18*d* in the direction indicated by the arrow A is L1, and the interval between the reinforcement plates 66 at the center of the side panel 18*d* in the longitudinal direction indicated by the arrow A is L2. The interval L2 is smaller than the interval L1 (L2<L1).

In the second embodiment, the interval L2 between the reinforcement plates 66 at the center of the side panel 18*d* in the direction indicated by the arrow A is smaller than the interval L1. Owing thereto, in the side panel 18*d*, in particular, the reinforcement plates 66 are fixed mainly to the central portion in the longitudinal direction where the deflection force is large in comparison with the other portions. Therefore, the deflection force is distributed further reliably. Accordingly, in the second embodiment, the same advantages as in the case of the first embodiment are obtained. Additionally, further improvement in the rigidity of the casing 14 is achieved reliably.

Figure 8:
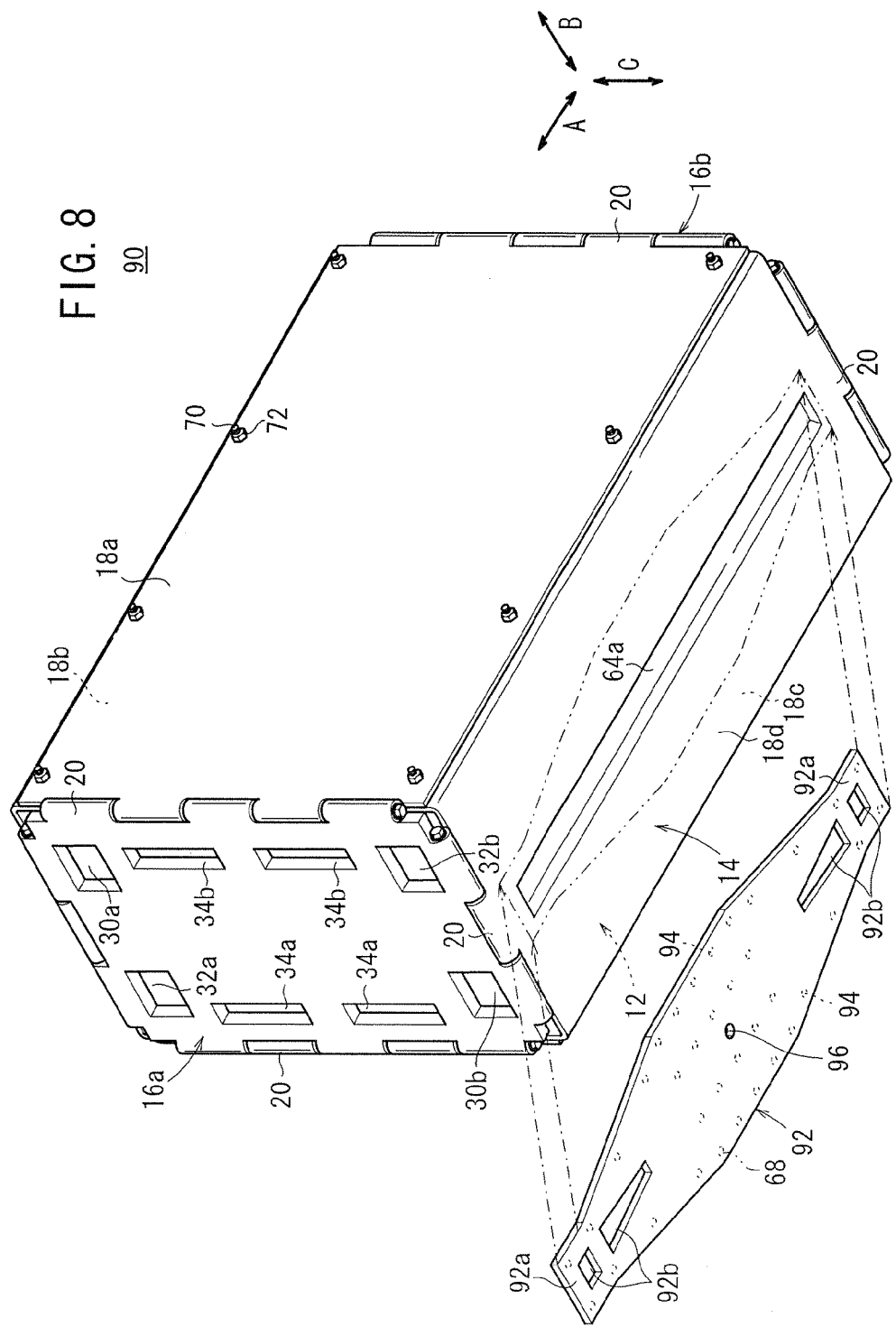
FIG. 8 is a partial exploded perspective view of a fuel cell stack according to a third embodiment of the present invention.

FIG. 8 is a partial exploded perspective view of a fuel cell stack 90 according to a third embodiment of the preset invention.

In the fuel cell stack 90, a reinforcement plate (reinforcement member) 92 is provided on the side panel 18*d* of the casing 14. The reinforcement plate 92 is a plate having narrow portions 92*a* at both ends in the direction indicated by the arrow A. Further, holes 92b are formed in the respective narrow portions 92a for weight reduction.

Figure 9:
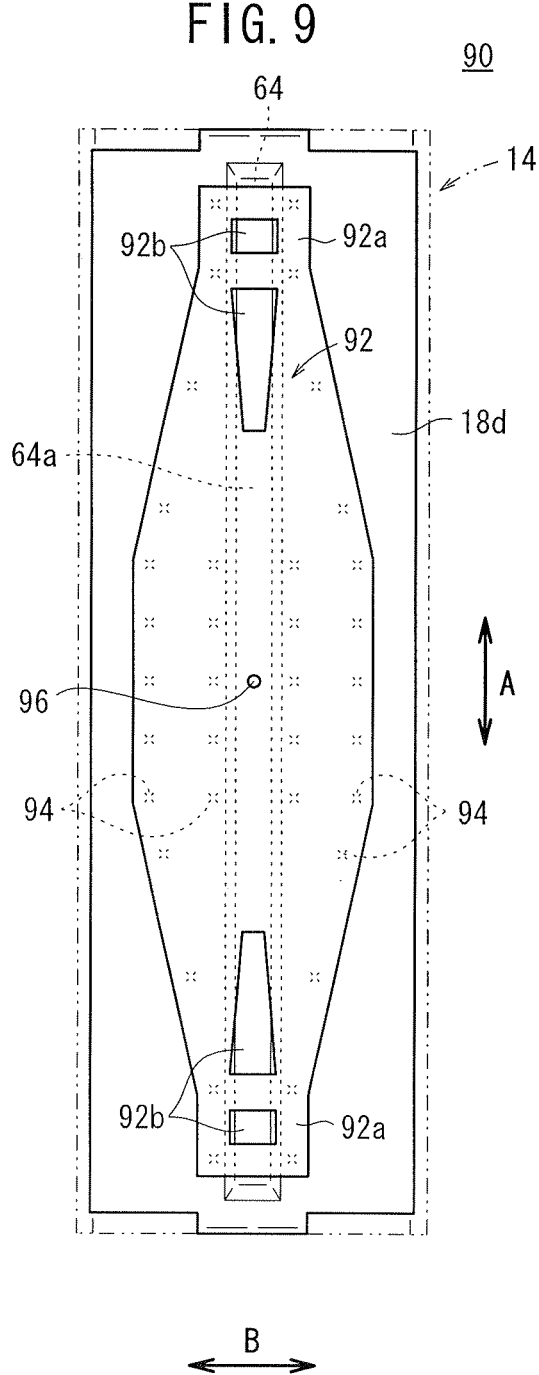
FIG. 9 is a bottom view of the fuel cell stack.

The reinforcement plate 92 is fixed to the side panel 18d at a plurality of welding points 94. As shown in FIG. 9, a predetermined number of the welding points 94 are formed in each of both sides of the recess 64a. Specifically, the welding points 94 are arranged in one line on each side of both end portions in the direction indicated by the arrow A, and the welding points 94 are arranged in two lines on each side of the center portion in the direction indicated by the arrow A. A drainage hole 96 is provided at substantially the central position of the reinforcement plate 92.

In the third embodiment, in correspondence with the area where the load may be applied to the casing 14 and deformation of the casing 14 may occur, the shape of the reinforcement plate 92 and distribution of the welding points 94 are determined. Specifically, at both ends of the side panel 18d in the direction indicated by the arrow A where the deformation and load are small, the narrow portions 92a and the holes 92b are provided in order to reduce the weight of the reinforcement plate 92. Further, at the center of the side panel 18d in the direction indicated by the arrow A where the deformation and load are large, the welding points 94 are arranged in two lines on each of both sides of the recess 64a.

In the third embodiment, the deflection force applied to the center of the side panel 18d can be supported reliably and easily. Accordingly, the same advantages as in the cases of the first and second embodiments are achieved. For example, deformation of the casing 14 is prevented as much as possible.

Further, the drainage hole 96 is provided at the portion where the maximum deformation tends to be caused, i.e., at the center of the reinforcement plate 92. The condensed water in the fuel cell stack 90 and water introduced into the casing 14 is eliminated through the drainage hole 96. Thus, improvement in the rust prevention property and insulating property is achieved suitably.

Figure 10:
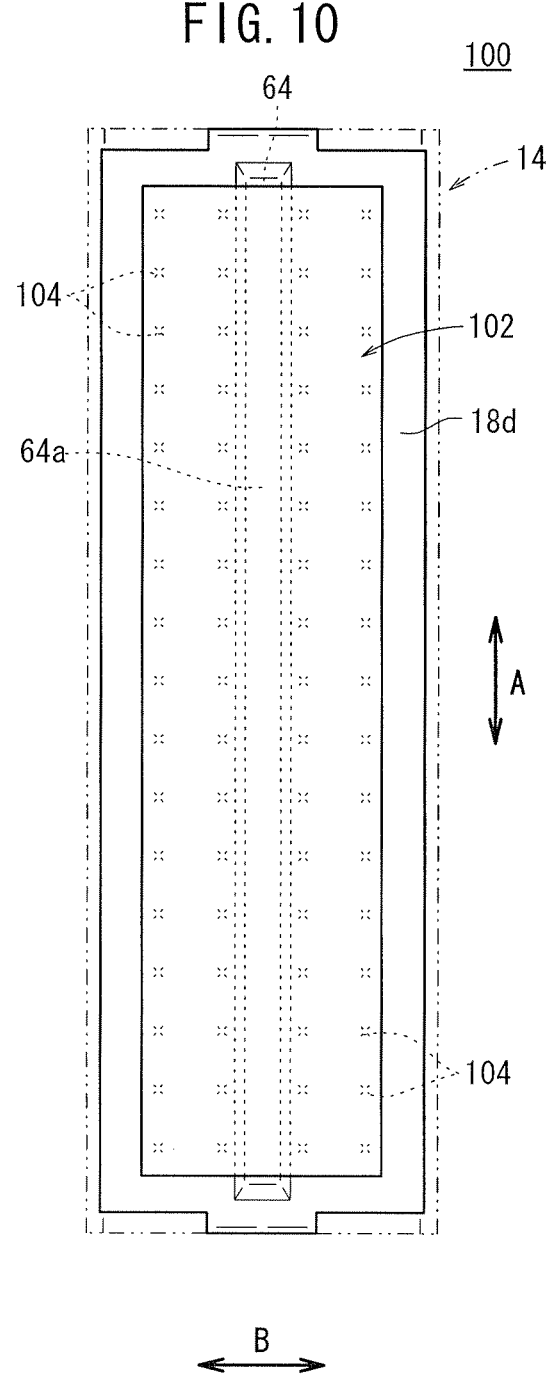
FIG. 10 is a bottom view of a fuel cell stack according to a fourth embodiment of the present invention.

FIG. 10 is a bottom view showing a fuel cell stack 100 according to a fourth embodiment of the present invention.

The fuel cell stack 100 includes a reinforcement plate (reinforcement member) 102 fixed to the side panel 18d of the casing 14. The reinforcement plate 102 is a rectangular thin plate fixed to the side panel 18d at welding points 104, which are provided in two lines on each of both sides of the recess 64a.

Figure 11:
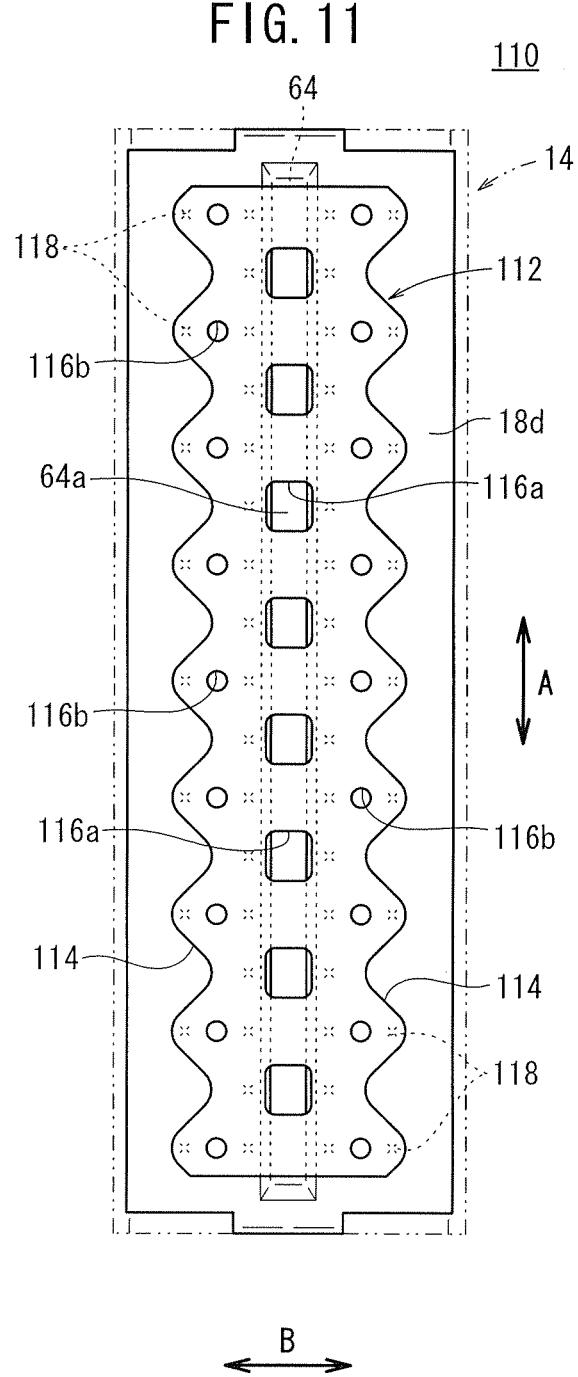
FIG. 11 is a bottom view of a fuel cell stack according to a fifth embodiment of the present invention.

FIG. 11 is a bottom view showing a fuel cell stack 110 according to a fifth embodiment of the present invention.

The fuel cell stack 110 includes a reinforcement plate (reinforcement member) 112 fixed to the side panel 18d of the casing 14. The reinforcement plate 112 has saw-tooth-shaped cutouts 114 on both sides thereof in the directions indicated by the arrow A, and a plurality of circular holes 116a are formed along the recess 64a. Holes 116b each having a relatively small diameter are arranged in a left line and a right line in parallel with the direction in which the holes 116a are arranged. The reinforcement plate 112 is fixed to the side panel 18d at welding points 118, which are arranged in two rows on each of both sides of the recess 64a.

Figure 12:
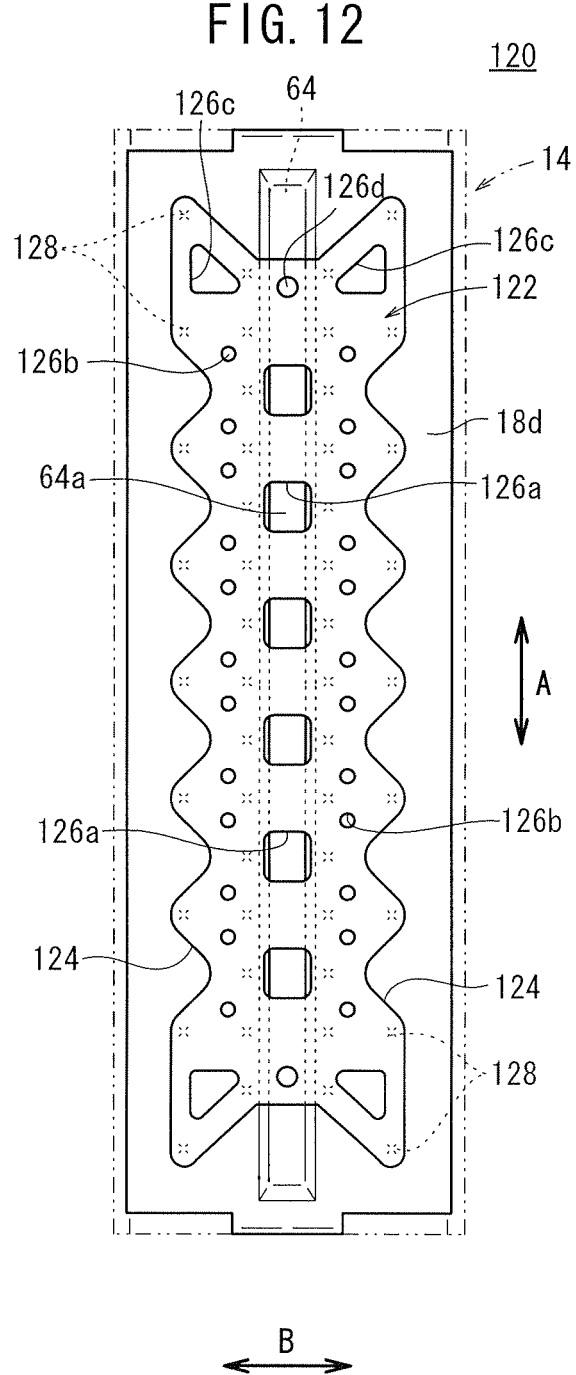
FIG. 12 is a bottom view of a fuel cell stack according to a sixth embodiment of the present invention.

FIG. 12 is a bottom view showing a fuel cell stack 120 according to a sixth embodiment of the present invention.

The fuel cell stack 120 includes a reinforcement plate (reinforcement member) 122 fixed to the side panel 18d. Cutouts 124 having a saw-tooth-shape are formed on both sides of the reinforcement plate 112, and circular holes 126a each having a relatively large diameter are formed along the recess 64a. Two left circular holes 126b and two right circular holes 126b are formed on both sides of the holes 126a and between the holes 126a. Two holes 126c and one hole 126d are formed at each of both ends of the reinforcement plate 122 in the direction indicated by the arrow A. The reinforcement plate 122 is fixed to the side plate 18d at a plurality of welding points 128, which are arranged in two rows on each of both sides of the recess 64a.

Figure 13:
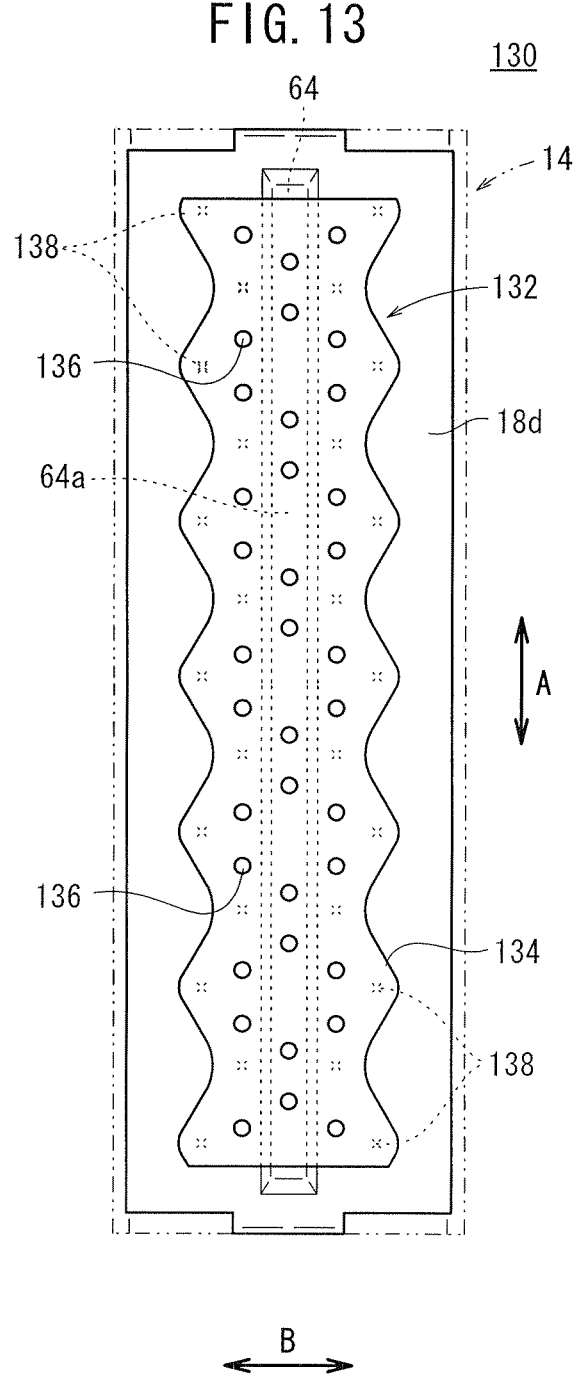
FIG. 13 is a bottom view of a fuel cell stack according to a seventh embodiment of the present invention.

FIG. 13 is a bottom view showing a fuel cell stack 130 according to a seventh embodiment.

The fuel cell stack 130 includes a reinforcement plate (reinforcement member) 132 fixed to the side panel 18d. The reinforcement plate 132 has a plurality of curved cutouts 134 along both of long sides. A plurality of circular holes 136 are formed in the reinforcement plate 132 for weight reduction. The reinforcement plate 132 is fixed to the side panel 18d at plurality of welding points 138 arranged on each of both sides of the recess 64a in a zigzag pattern in the direction indicated by the arrow A.

Figure 14:
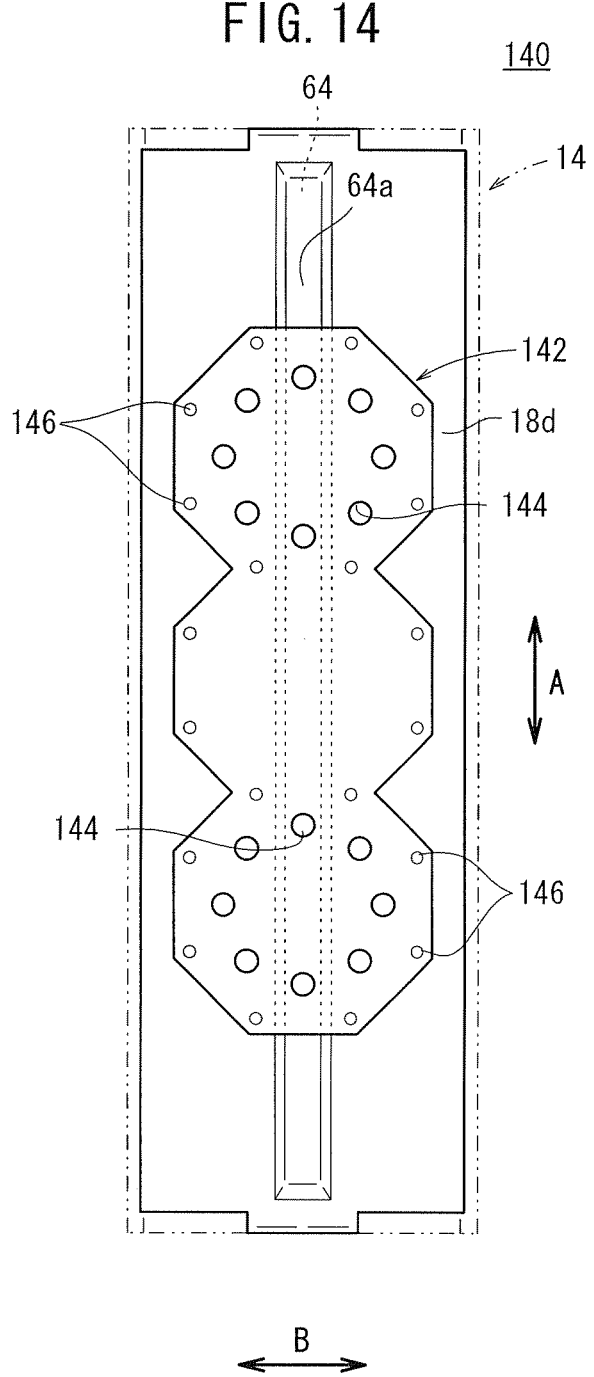
FIG. 14 is a bottom view of a fuel cell stack according to an eighth embodiment of the present invention.

FIG. 14 is a bottom view showing a fuel cell stack 140 according to an eighth embodiment of the present invention.

The fuel cell stack 140 includes a reinforcement plate (reinforcement member) 142 fixed to the side panel 18d. The reinforcement plate 142 has a shape formed by connecting a plurality of polygons such as octagons. A plurality of holes 144 are formed in each of the polygons on both ends of the side panel 18d in the directions indicated by the arrow A. The reinforcement plate 142 is fixed to the side panel 18d at welding points 146 provided at positions corresponding to the corners of the polygons.

Figure 15:
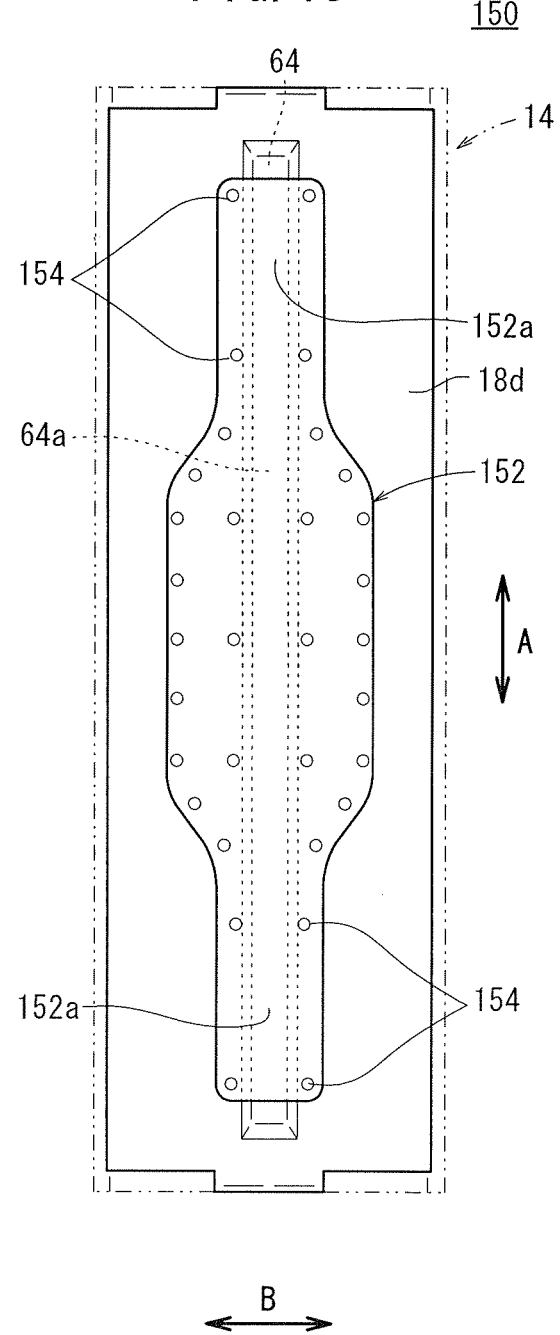
FIG. 15 is a bottom view of a fuel cell stack according to a ninth embodiment of the present invention.

FIG. 15 is a bottom view showing a fuel cell stack 150 according to a ninth embodiment of the present invention.

The fuel cell stack 150 includes a reinforcement plate (reinforcement member) 152 fixed to the side plate 18d. The reinforcement plate 152 has narrow portions 152a at both ends in the direction indicated by the arrow A. The reinforcement plate 152 is fixed to the side panel 18d at a plurality of welding points 154. The welding points 154 are densely arranged at the center in the direction indicated by the arrow A.

As described above, in the fourth to ninth embodiments, the same advantages as in the cases of the first to third embodiments are obtained.

Figure 16:
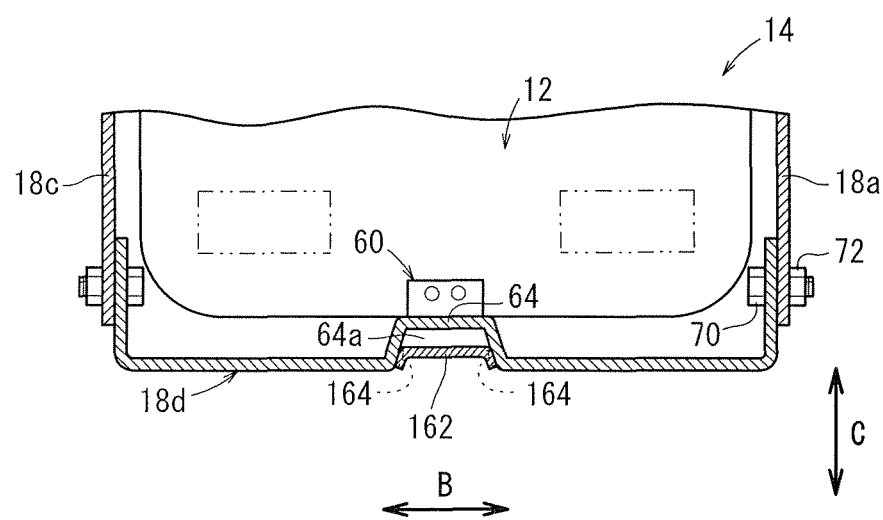
FIG. 16 is cross sectional view of a lower portion of a casing of a fuel cell stack according to a tenth embodiment of the present invention.
Figure 17:
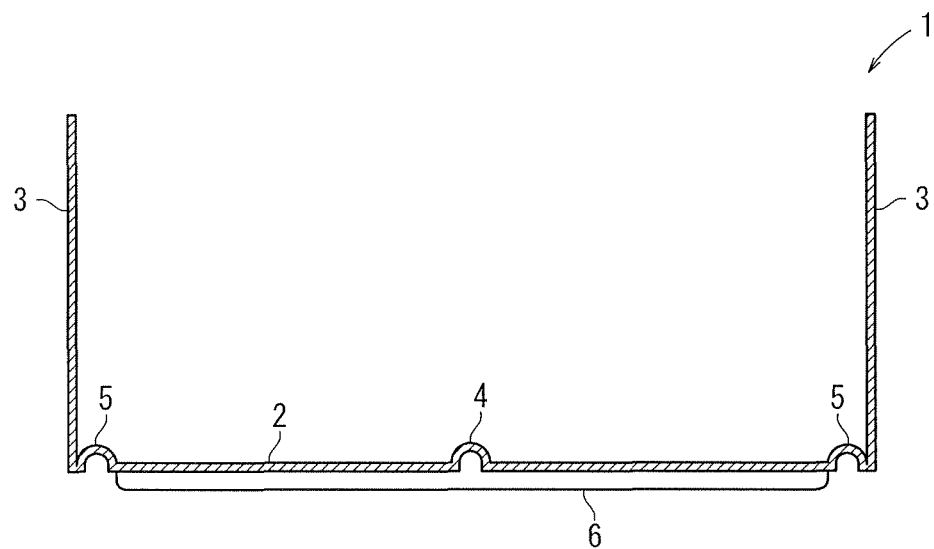
FIG. 17 is a partial cross sectional view of a fuel cell disclosed in Japanese Laid-Open patent Publication No. 08-171926.

FIG. 16 is a cross sectional view showing a lower part of a casing 14 of a fuel cell stack 160 according to a tenth embodiment of the present invention.

The fuel cell stack 160 includes a reinforcement plate (reinforcement member) 162 fixed to the side panel 18d. The reinforcement plate 162 is provided inside the recess 64a, and fixed to the side panel 18d at a plurality of welding points 164.

Thus, in the tenth embodiment, the reinforcement plate 162 does not protrude outwardly from the side panel 18d, and further size reduction in the fuel cell stack 160 is achieved.

While the invention has been particularly shown and described with reference to preferred embodiments, it will be understood that variations and modifications can be effected thereto by those skilled in the art without departing from the scope of the invention as defined by the appended claims.

What is claimed is:
1. A fuel cell stack comprising:
a stack body formed by stacking a plurality of unit cells in a horizontal direction, the unit cells each formed by sandwiching an electrolyte electrode assembly between separators, the electrolyte electrode assembly including a pair of electrodes and an electrolyte interposed between the electrodes,
a casing containing the stack body, the casing including a bottom plate member with a single ridge for receiving a load of the stack body, the single ridge protruding towards the stack body and oriented in the stacking direction, a recess created on a back surface of the single ridge, a separate reinforcement member, the separate reinforcement member being a flat plate bridging the recess by extending from a first side of the recess to a second side of the recess in a direction perpendicular to the orientation of the ridge, an unoccupied space being present between the separate reinforcement member and the back surface of the ridge, passages for allowing at least a reactant gas or a coolant to flow in the stacking direction of the unit cells, the passages extending through both sides of a lower part of the separator, and a load receiver supported by the single ridge, the load receiver provided between the passages at the lower part of the separators and in contact with the single ridge, wherein lower edge portions of the separators directly below the passages are not in contact with the bottom plate member.

2. A fuel cell stack according to claim 1, wherein the flat plate is fixed to the bottom plate member by spot welding.

3. A fuel cell stack according to claim 2, wherein in the flat plate, the number of welding points at the center in the stacking direction of the unit cells is larger than the number of welding points at each end in the stacking direction of the unit cells.

4. A fuel cell stack according to claim 1, wherein the flat plate comprises a plurality of flat plates provided along the stacking direction of the unit cells, and the interval between the flat plates at the center in the stacking direction of the unit cells is smaller than the interval between the flat plates at each end in the stacking direction of the unit cells.

5. A fuel cell stack according to claim 1, wherein the flat plate comprises a single flat plate provided along the ridge; and the flat plate has a hole.

6. A fuel cell stack according to claim 5, wherein the width of the flat plate at the center in the stacking direction of the unit cells is larger than the width of the flat plate at each end in the stacking direction of the unit cells.

7. A fuel cell stack according to claim 1, wherein the flat plate is fixed inside the recess.

* * * * *